United States Patent [19]
Kawasaki

[11] Patent Number: 4,794,473
[45] Date of Patent: Dec. 27, 1988

[54] FAST MODE REEL SERVO IN A MAGNETIC RECORDING/REPRODUCING APPARATUS

[75] Inventor: Ken-ichiro Kawasaki, Saitama, Japan

[73] Assignee: Pioneer Electronic Corporation, Tokyo, Japan

[21] Appl. No.: 55,282

[22] Filed: May 29, 1987

[30] Foreign Application Priority Data

May 29, 1986 [JP] Japan .................. 61-125098

[51] Int. Cl.$^4$ .................. G11B 21/04; G11B 15/46
[52] U.S. Cl. .................. 360/70; 360/73 R
[58] Field of Search .................. 360/73, 70

[56] References Cited

U.S. PATENT DOCUMENTS

| | | | |
|---|---|---|---|
| 4,626,936 | 12/1986 | Yoshino | 360/70 |
| 4,688,115 | 8/1987 | Takahashi | 360/70 |
| 4,714,970 | 12/1987 | Edakubo | 360/73 |

Primary Examiner—A. J. Heinz
Attorney, Agent, or Firm—Sughrue, Mion, Zinn, Macpeak, and Seas

[57] ABSTRACT

A reel speed servo for inclined recording tracks such as used in R-DAT. The two rotary magnetic heads are inclined at different azimuth angles. The relative speed between each of the heads and the tape is detected. Then the difference of these relative speeds is determined to thereby detect the speed of the tape, which is thus used in the reel speed servo.

3 Claims, 3 Drawing Sheets

FAST MODE REEL SERVO IN A MAGNETIC RECORDING/REPRODUCING APPARATUS

BACKGROUND OF THE INVENTION

1. Field of the Invention

The present invention relates to a magnetic recording/reproducing apparatus, such as used in an R-DAT (rotary head-digital audio tapedeck).

2. Background of the Invention

In a recently standardized R-DAT, about 2 hours of information (in an SP mode) can be recorded/reproduced on one reel of magnetic tape. Accordingly, it is desired that a desired program recorded on the magnetic tape can be searched in a short time as possible.

FIG. 1 is a block diagram of an apparatus proposed for satisfying the above-mentioned requirement. A rotary drum 1 is provided with a pair of rotary magnetic heads 2 (separately identified as 2A and 2B) having azimuth angles different from each other. A magnetic tape 3 taken up by a supply reel 4 and a take-up reel 5 is wound around the rotary drum 1 by about 90 degrees. Motors 6, 7 and 8 are arranged to rotate the respective reels 4 and 5 and the rotary drum 1. A reproducing signal produced when the rotary magnetic heads 2 trace the magnetic tape 1 is equalized by a reproducing equalizer amplifying circuit 9 and then applied to a relative velocity detection circuit 10. The relative velocity detection circuit 10 detects a relative velocity between the magnetic tape 3 and the respective rotary head 2, for example, by comparing a clock included in the reproduced signal with a reference clock. A drum servo circuit 11 compares an output signal of the velocity detection circuit 10 with a predetermined reference signal to control the motor 8 for rotating the rotary drum 1 in accordance with a resultant error signal. As a result, the rotary magnetic heads 2 run at a predetermined relative velocity determined in accordance with the reference signal relative to the magnetic tape 3.

A pulse generating circuit 12 is constituted by a pulse generator (PG) for producing about 1 to 2 pulses per one revolution corresponding to the rotational position of the rotary magnetic heads 2, a frequency generator (FG) for producing about 20 pulses per one revolution, and so on. A switching pulse generation circuit 13 generates a head switching pulse (HSWP) on the basis of an output of the pulse generator or from the respective outputs of the pulse generator and the frequency generator. The head switching pulse is applied to the reproducing equalizer amplifying circuit 9 to switch the two rotary magnetic heads 2 (2A and 2B) by changing a switch disposed in the front stage of the reproducing equalizer amplifying circuit 9. The output of the frequency generator (FG) is used also for a velocity servo for the rotary drum 1 in normal recording/reproducing.

On the other hand, pulse generation circuits 14 and 15 provided respectively corresponding to the reels 4 and 5 generate pulses in accordance with the rotation of the reels, the pulses being transferred to an operation circuit 16. The operation circuit 16 calculates a sum of the respective squares of the rotation periods of the reels 4 and 5, the resultant calculated value being transferred to a reel servo circuit 17. The reel servo circuit 17 compares the sum-of-the-squares values with a predetermined reference value so as to control the rotation of the motors 6 and 7 on the basis of a resultant error signal. Accordingly, the magnetic tape 3 is caused to run at a predetermined velocity determined in accordance with the reference value.

Thus, upon reception of a search command, a system controller 18 constituted by a microcomputer, etc., controls the reel servo circuit 17 so that the magnetic tape 3 is caused to run at a velocity higher than that in normal recording/reproducing. Predetermined code information such as a music number, an absolute time, etc., recorded in an inclined track on the magnetic tape are then reproduced to search a desired program.

If the apparatus is arranged such that the servo of the magnetic tape 3 in searching is carried out by the pulse generation circuits 14 and 15 provided respectively corresponding to the reels 4 and 5 as described above, the apparatus becomes complicated and large-sized. Further, there is such a disadvantage that the velocity of the magnetic tape 3 varies unless the reference value is changed in accordance with the length (total length) and the thickness of the magnetic tape 3.

SUMMARY OF THE INVENTION

It is therefore an object of the present invention to eliminate the above disadvantages in the prior art.

It is another object of the present invention to provide a magnetic recording/reproducing apparatus in which a relative velocity between respective rotary magnetic head and a magnetic tape is detected on the basis of the output signals of the rotary magnetic heads, so that the velocity of the magnetic tape is calculated on the basis of the output signal to thereby control the running state of the magnetic tape.

It is a further object of the present invention to provide a magnetic recording/reproducing apparatus which can be made smaller and simplified in comparison with the case where rotation of a reel is detected, and in which the velocity of the magnetic tape does not vary if the total length, thickness, etc., of the magnetic tape vary.

According to an aspect of the present invention, the magnetic recording/reproducing apparatus for recording/reproducing information onto/from an inclined track on a magnetic tape uses at least two rotary magnetic heads having different azimuth angles different from each other. The apparatus comprises a detection circuit for detecting a relative velocity between the magnetic tape and the respective rotary magnetic head on the basis of respective output signals of the rotary magnetic heads, an operation circuit for operating on the output signal of the detection circuit to produce an output signal corresponding to a velocity of the magnetic tape, and a servo circuit for causing the magnetic tape to run in accordance with the output signal of the operation circuit at a velocity different from that in normal recording/reproducing.

A relative velocity between the magnetic tape and the respective rotary magnetic head is detected on the basis of the respective output signals of the rotary magnetic heads, and the detection signal is operated upon to generate an output signal corresponding to the velocity of the magnetic tape, so that the running state of the magnetic tape in searching is controlled in accordance with the output signal.

DETAILED DESCRIPTION OF PREFERRED EMBODIMENT

Figure 1:
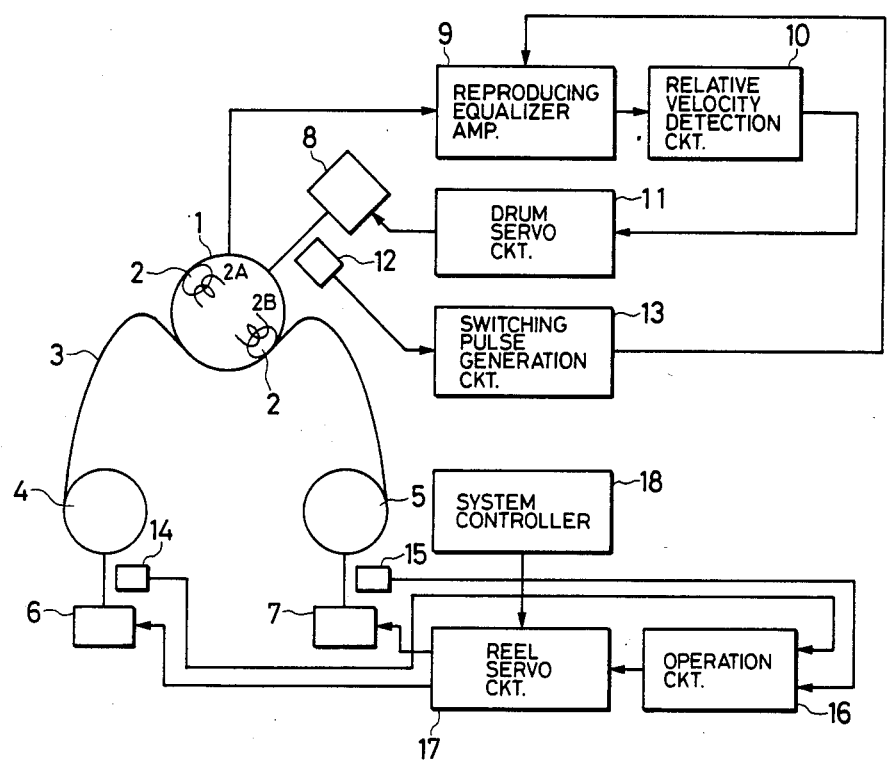
FIG. 1 is a block diagram showing a conventional magnetic recording/reproducing apparatus.
Figure 2:
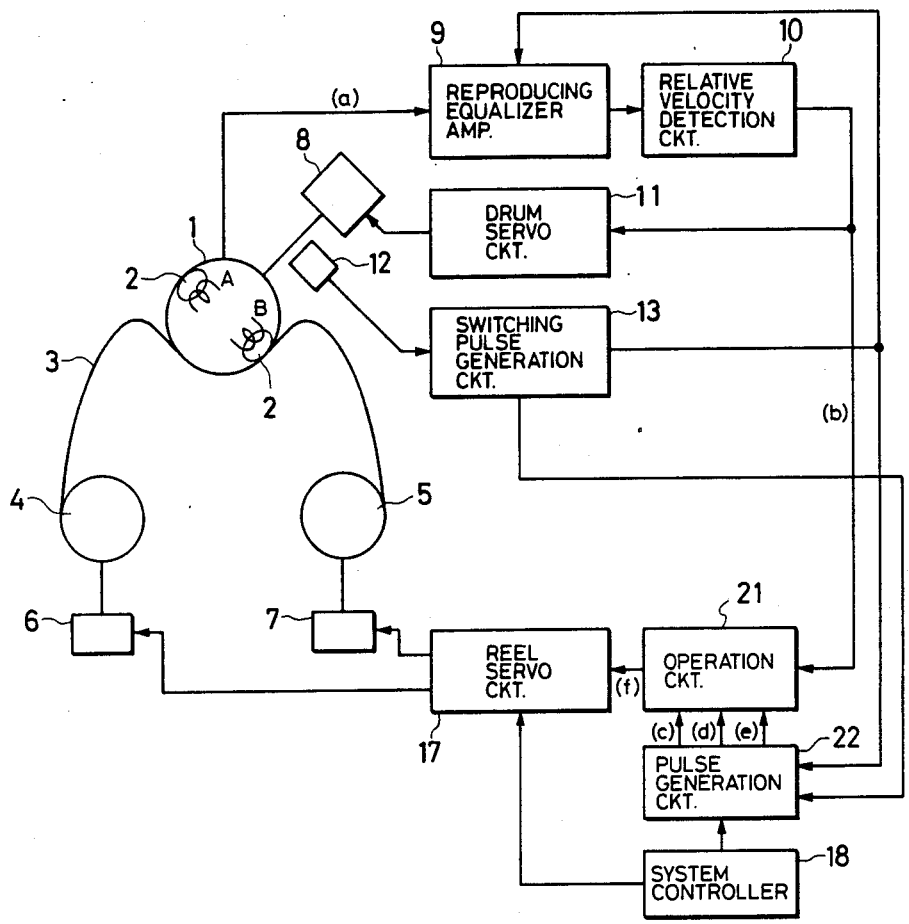
FIG. 2 is a block diagram showing a magnetic recording/reproducing apparatus accoring to the present invention.

FIG. 2 is a block diagram of a magnetic recording/reproducing apparatus according to the present invention, in which the parts corresponding to those in FIG. 1 are correspondingly referenced and the detailed description as to those parts will be omitted. According to the present invention, an output signal of a relative velocity detection circuit 10 is applied not only to a drum servo circuit 11 but to an operation circuit 21. Furthermore, pulses produced by a pulse generation circuit 22 controlled by a system controller 18 are applied to the operation circuit 21. A head switching pulse HWSP produced by a switching pulse generation circuit 13 and a pulse produced by a frequency generator are applied to the pulse generation circuit 22.

Figure 3:
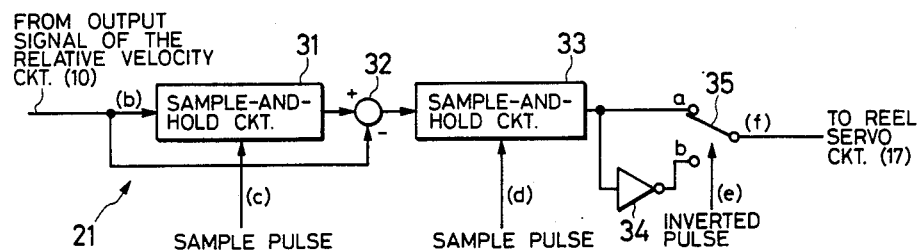
FIG. 3 is a block diagram showing an operation circuit in the apparatus of FIG. 1.

The operation circuit 21 is arranged in such a manner as shown in FIG. 3. That is, the output signal of the relative velocity detection circuit 10 is applied to a sample-and-hold circuit 31 and to a subtraction circuit 32. The subtraction circuit 32 subtracts the output of the relative velocity detection circuit 10 from the output of the sample-and-hold circuit 31. The resultant difference is transferred to a second sample-and-hold circuit 33. The output of the second sample-and-hold circuit 33 is applied to a reel servo circuit 17 through a switch 35 directly or after being inverted by an inversion circuit 34. The pulse produced from the pulse generation circuit 22 is applied to each of the sample-and-hold circuits 31 and 33 and the switch 35 as a control signal.

Figure 6:
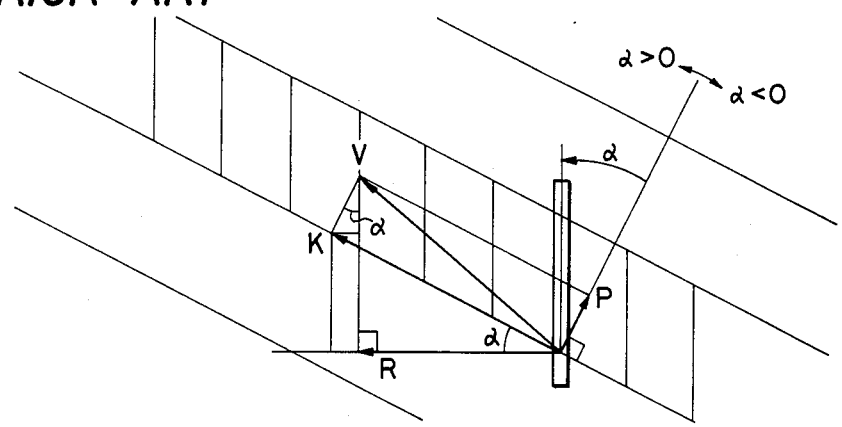

The other parts of the circuit are the same as those in FIG. 6.

Upon reception of a search command, the system controller 18 controls motors 6 and 7 driving the reels 4 and 5 through the reel servo circuit 17 to cause a magnetic tape 3 to run in a wound state around a rotary drum 2 and at a velocity higher than that in recording/reproducing, for example, at a velocity 200 times as high as during normal recording and reproducing.

Figure 4:
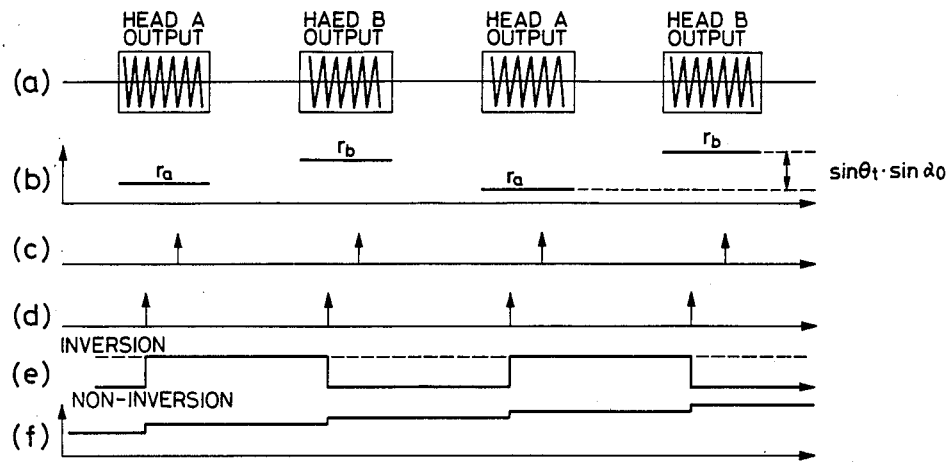
FIG. 4 is a time chart of the operation circuit.

At this time, the two rotary magnetic heads 2A and 2B alternately come into contact with the magnetic tape 3 to reproduce a signal from an inclined track as shown in trace (a) of FIG. 4. The reproduced RF signal is applied to a reproducing equalizer amplifying circuit 9 so as to be equalized therein and is then applied to the relative velocity detection circuit 10. Similarly to the case described above, the relative velocity detection circuit 10 compares, for example, a clock of a predetermined frequency contained in a reproduced signal with a reference clock produced by a reference oscillation circuit. This comparison is used to detect a relative velocity between the magnetic tape 3 and the respective rotary magnetic head 2.

Figure 5:
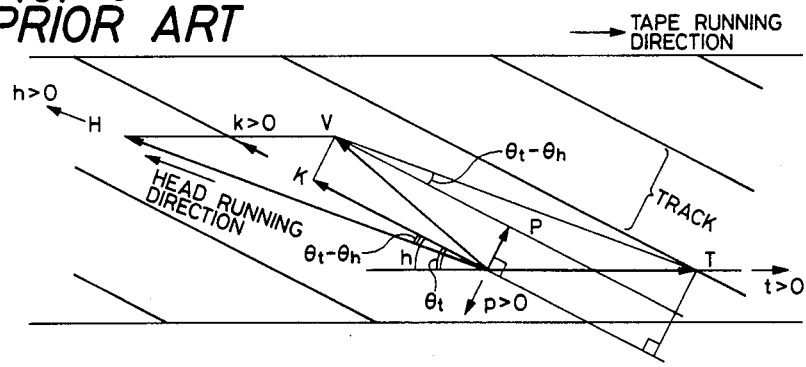
FIGS. 5 and 6 are vector diagrams.

If, as shown in FIG. 5 the velocity vector of the respective rotary magnetic head 2 is represented by H and the velocity vector of the magnetic tape 3 is represented by T (the magnitudes thereof being represented by h and t respectively), a relative velocity vector V representing a physical relative velocity between the respective rotary head 2 and the magnetic tape 3 is expressed as shown in this figure (the magnitude of the relative velocity vector being represented by v). Now let the angle of the inclined track relative to the longitudinal direction of the magnetic tape 3 (while stopped) be represented by $\theta_t$ and the angle of the trace locus of the respective rotary head 2 relative to the longitudinal direction of the magnetic tape 3 (while stopped) be represented by $\theta_h$. Let the vectors of components of the relative velocity vector V in the direction parallel to and perpendicular to the inclined track be represented by K and P respectively (the magnitudes thereof being represented by k and p, respectively). Finally, let the positive direction of each of the vectors V and P lie along the direction of respective arrows in the drawing. Then the components k and p are expressed as follows.

$$k = h\cos(\theta_t - \theta_h) - t\cos\theta_t \qquad (1)$$

$$p = h\sin(\theta_t - \theta_h) - t\cos\theta_t \qquad (2)$$

On the other hand, let the positive and negative directions of an azimuth angle $\alpha$ which is an angle of the head gap relative to the direction perpendicular to the longitudinal direction of the magnetic tape 3 be defined as shown in FIG. 6. Then an effective relative velocity vector R (with magnitude r) between the respective rotary magnetic head 2 and the magnetic tape 3 becomes a component in the direction vertical to the head gap of the physically relative velocity vector V. The magnitude r of this relative velocity vector R is expressed by the following equation.

$$r = k\cos\alpha + p\sin\alpha \qquad (3)$$

If the azimuth angles $\alpha$ of the two rotary magnetic heads 2 (heads 2A and 2B) are set to be $\alpha_0$ and $-\alpha_0$ respectively, the effective relative velocities $r_a$ and $r_b$ of the heads A and B are expressed as follows from the equation (3).

$$r_a = k\cos\alpha_0 + p\sin\alpha_0 \qquad (4)$$

$$r_b = k\cos\alpha_0 + p\sin\alpha_0 \qquad (5)$$

The difference $\delta$ between the respective effective relative velocities of the heads A and B is as follows.

$$\begin{aligned}\delta &= r_a - r_b \\ &= 2p\sin\alpha_0\end{aligned} \qquad (6)$$

If equation (2) is substituted into equation (6), the following equation is obtained.

$$\begin{aligned}\delta &= 2[h\sin(\theta_t - \theta_h) - t\sin\theta_t]\sin\alpha_0 \\ &= 2h\sin(\theta_t - \theta_h)\sin\alpha_0 \\ &\quad - 2t\sin\theta_t \cdot \sin\alpha_0\end{aligned} \qquad (7)$$

The difference between the angles $\theta_t$ and $\theta_h$ is generally small, and the following equation is satisfied:

$$(\theta_t - \theta_h) \approx 0 \qquad (8)$$

Accordingly, the following equation is satisfied:

$$\sin(\theta_t - \theta_h) \approx 0 \qquad (9)$$

If equation (9) is substituted into equation (7), the following equation is obtained.

$$\delta \approx -2t \sin\theta_r \sin\alpha_0 \qquad (10)$$

As seen from equation (10), the difference δ in effective relative velocity between the heads 2A and 2B is proportional to the velocity t of the magnetic tape 3. Accordingly, if the difference δ is detected from the reproduced signal, the velocity t can be calculated.

If the difference between the angles $\theta_t$ and $\theta_h$ is so large that the velocity h of the respective magnetic head 2 in the equation (7) cannot be disregarded, the velocity t can be obtained in such a manner that the velocity h of the respective rotary magnetic head 2 is detected by using the frequency generator (FG), or the like, attached on the rotary drum 1 and the velocity t is calculated by substituting the detected value for equation (7).

The effective relative velocity signals $r_a$ and $r_b$ (trace (b) of FIG. 4) of the heads 2A and 2B produced from the relative velocity detection circuit 10 are applied to the sample-and-hold circuit 31 and the subtraction circuit 32 which constitute the operation circuit 21. The pulse generation circuit 22 generates two sampling pulses at the time when the heads 2A and 2B trace the magnetic tape 3. These two sampling pules can be timed. For example, by counting a predetermined number of the pules of the frequency generator (FG) produced by the switching pulse generation circuit 13 beginning from a leading edge or a trailing edge of the head switching pulse produced from the switching pulse generation circuit 13. One sampling pulse (trace (c) of FIG. 3) of the two sampling pulses is applied to the first sample-and-hold circuit 31 and the other (trace (d)) is applied to the second sample-and-hold circuit 33.

Upon reception of the sampling pulse, the first sample-and-hold circuit 31 successively samples and holds the effective relative velocities $r_a$ and $r_b$ of the head 2A and the head 2B. Assuming that, for example, the relative velocity $r_a$ is now sampled and held in the first sample-and-hold circuit 31, the held value $r_a$ is applied to the subtraction circuit 32. When the tracing by the head A has been completed and that by the head B begins, the relative velocity $r_b$ is applied to the subtraction circuit 32, and the subtraction circuit 32 produces a difference $(r_a - r_b)$ between the relative velocities $r_a$ and $r_b$. A sampling pulse is applied to the sample-and-hold circuit 33 at the time when the difference signal $(r_a - r_b)$ is produced from the subtraction circuit 32, so that the sample-and-hold circuit 33 samples, holds and outputs the difference signal $(r_a - r_b)$. As seen from the equation (10), the difference δ in relative velocity between heads A and B is proportional to the negative magnitude $(-t)$ of the velocity of the magnetic tape 3. The switch 35 is switched to the b contact side by a reversing pulse to thereby transfer the difference signal $(r_a - r_b)$ to the reel servo circuit 17 after the difference signal $(r_a - r_b)$ is inverted in polarity by the inversion circuit 34 (trace (f) of FIG. 4).

Similarly, upon reception of the next sampling pulse, the first sample-and-hold circuit 31 samples and holds the relative velocity $r_b$ of the head B, and the second sample-and-hold circuit 33 samples and holds a difference signal $(r_b - r_a)$. The difference signal in this case has a polarity coincident with the polarity of the velocity t of the magnetic tape 3, so that the switch 35 is switched the a contact side by a reversing pulse to transfer the difference signal to the reel servo circuit 17 without passing through the inversion circuit 34 (trace (f)).

The polarity of the different δ in relative velocity between the heads 2A and 2B is reversed between the cases of fast feeding (t>0) and rewinding (t<0), so that the polarity of the reversing pulse for switching the switch 35 is reversed between these two cases of fast feeding and rewinding.

The reel servo circuit 17 compares the received difference signal with a predetermined reference value so as to control the motors 6 and 7 on the basis of the resultant error signal. Accordingly, if the reference value is suitably selected, the magnetic tape 3 can be made to run at a constant and high velocity (for example, at a velocity 200 times as fast as that in normal recording/reproducing).

Although the case in which the embodiment according to the present invention is applied to an R-DAT has been described above, the present invention can also be applied to other magnetic recording/reproducing apparatus.

According to the present invention, as described above, the magnetic recording/reproducing apparatus for recording/reproducing information onto/from an inclined track on a magnetic tape by means of at least two rotary magnetic heads having different azimuth angles between them, comprises a detection circuit for detecting a relative velocity between the magnetic tape and the respective rotary magnetic head on the basis of respective output signals of the rotary magnetic heads, an oeration circuit for operating on the output signal of the detection circuit to produce an output signal corresponding to a velocity of the magnetic tape, and a servo circuit for causing the magnetic tape to run in accordance with the output signal of the operation circuit at a velocity different from that in normal recording/reproducing. Accordingly, the apparatus can be miniaturized and simplified in comparison with the case in which the rotation of a reel is detected. Further, the operation circuit can be made simple and small-scaled. Even if the total length, thickness, or the like of the magnetic tape varies, the velocity of the tape never varies.

What is claimed is:

1. A magnetic reproducing apparatus for reproducing information from an inclined track on a magnetic tape, comprising:
    at least two rotary magnetic heads having respective azimuth angles with respect to a tape transport direction different from each other;
    detection circuit means for detecting at least two respective relative velocities between said magnetic tape and said rotary magnetic heads on the basis of respective output signals of said at least two rotary magnetic heads;
    operation circuit means for operation on output signals of said detection circuit representing said two relative velocities to produce an output signal corresponding to an absolute velocity of said magnetic tape; and
    servo circuit means for causing said magnetic tape to run in accordance with the output signal of said operation circuit at a predetermined velocity.

2. An apparatus as recited in claim 1, wherein said predetermined velocity differs from a velocity used in reproducing.

3. An apparatus as recited in claim 1, wherein said operation circuit means detects a difference between relative velocities of two of said rotary magnetic heads to produce said output signal of said operation circuit.

* * * * *